United States Patent [19]

Grünenfelder

[11] Patent Number: 5,668,801
[45] Date of Patent: Sep. 16, 1997

[54] METHOD FOR EVALUATING A NUMBER OF DISCRIMINATED DIGITAL DATA UNITS AND FOR ESTIMATING THE RESPONSE TIME

[75] Inventor: Reto Grünenfelder, Dietlikon, Switzerland

[73] Assignee: Alcatel STR AG, Zurich, Switzerland

[21] Appl. No.: 505,450

[22] Filed: Jul. 21, 1995

[30] Foreign Application Priority Data

Jul. 28, 1994 [CH] Switzerland .................. 02381/94

[51] Int. Cl.$^6$ ............................................. H04J 1/16
[52] U.S. Cl. .............................................. 370/253
[58] Field of Search ................................ 370/242, 244, 370/248, 250, 252, 253, 389, 395, 470, 471

[56] References Cited

U.S. PATENT DOCUMENTS

| | | | |
|---|---|---|---|
| 5,271,000 | 12/1993 | Engbersen et al. | 370/244 |
| 5,450,394 | 9/1995 | Gruber et al. | 370/253 |
| 5,467,342 | 11/1995 | Logston et al. | 370/253 |
| 5,521,907 | 5/1996 | Ennis, Jr. et al. | 370/17 |

*Primary Examiner*—Alpus H. Hsu
*Assistant Examiner*—Ricky Q. Ngu
*Attorney, Agent, or Firm*—Ware, Fressola, Van Der Sluys & Adolphson

[57] ABSTRACT

From a stream of digital data units (10), which exhibits gaps as a result of parameter monitoring, the number of missing data units must be determined and the response time of the parameter monitoring must be estimated at the place of determination for non-conforming data units (15, 16, 17; 21). The method is based on using the identification number (12, 13, ...), which is carried by the data unit (10), to detect the gaps. A starting time (L12) is established with the arrival of a first conforming data unit, which is continuously updated as long as no gap occurs. After a gap is detected, the updated time (L14) of the last conforming data unit serves as the lower barrier (L[1]) of the response time, that of the first conforming data unit (18) after the gap as the upper barrier (U[1]) of the response time. The number of missing data units can be derived from the gap in the identification numbers. The method can be immediately continued, so that many values can be stored and used for a statistical evaluation.

8 Claims, 2 Drawing Sheets

METHOD FOR EVALUATING A NUMBER OF DISCRIMINATED DIGITAL DATA UNITS AND FOR ESTIMATING THE RESPONSE TIME

TECHNICAL FIELD

The invention is in the area of data flow monitoring at transmission installation interfaces, namely digital communications networks.

BACKGROUND OF THE INVENTION

In many areas of application today, the transmission of information of any kind is achieved by means of digital data units. The form of the data units is suitably defined for the transmission medium, and is often standardized as well. Examples in this regard are the cells of the Asynchronous Transfer Mode (ATM), or the frames of a Metropolitan Area Network (MAN). The transmission media are designed so that the information from several sources can simultaneously utilize the same physical transmission device. This immediately results in the dilemma of optimum utilization. It consists in having the available capacities for the transportation of digital data units make good use of predetermined transmission devices such as lines, switching units, multiplexers etc., but on the one hand must take obstructions and outages into consideration without any fees, and on the other not restrict the users (sources) too heavily or block them arbitrarily. The problem is defused by reaching arrangements with the users regarding the modalities of the transmissions. If it must be possible to test the maintenance of the agreement on the side of the transmission device, and to impose fines if necessary, a parameter monitor is required at an interface, either at a user or a network interface, mainly known in the literature under the English concept of "usage parameter control" and "policing". A parameter monitor with the respective consequential measures, particularly the discarding of cells, can be useful or necessary irrespective of an agreement with the user, for example if it is necessary to protect a switching unit from overload.

Upon an offense against the agreement, the parameter monitor responds with a discrimination of the nonconforming data unit, usually discarding it or marking it for special treatment or removal later on. It is also possible for several adjacent data units to be discriminated. One or more adjacent discriminated data units are marked as a block of discriminated data units. The response time from one block of discriminated data units to the next is the decisive factor in evaluating the function of the parameter monitor. It is further interesting to know how many data units are affected. It is relatively easy to determine with the parameter monitor itself at what point in time a discrimination of a nonconforming data unit takes place, and how many successive data units are discriminated. However, these additional functions are probably not integrated into the respective parameter monitor, because of considerations of cost-effectiveness on the one hand—the functional evaluation is only used sporadically—and because of the lack of independence on the other. The response time and the number of discriminated data units should rather be determined at a different place in the network. For example, an ATM switching unit can contain a parameter monitor at the inlet, however the measurement to determine the function of the parameter monitor takes place at the outlet of a network interface located at a distance from the switching unit. However, this produces the difficulty that it is neither possible to measure a point in time at which a cell was discarded (since it no longer exists), nor to count how many cells were discarded.

Therefore, the task exists to present a method which makes it possible to perform parameter monitoring of the stream of digital data units arriving at a determined place in the digital network, which acts on the response time of another, possibly far removed place in the network, and to determine the number of discriminated data units.

The method of the invention fulfills the task in that it measures a lower and an upper time barrier at a fixed place in the network, at which the response time is located during that time. The process first receives the missing information about the drop-out of one or more data units from the continuous monitoring of the identification numbers carried by the data units. By comparing the incoming sequence with the sequence of identification numbers known from the agreement, not only the lack of a data unit but also the number of missing data units can be determined. Subsequently, the point in time of the arrival of the last conforming data unit before a block of discriminated data units can be determined, as well as the first conforming data unit that follows it. Together with the starting time determined during the initialization, it provides a measurement of both barriers of the response time at the measurement place.

The method, which comprises the initialization step, the repeated data input steps and the storage step after a gap has been detected in the sequence of data units, has the advantage that only very few operations need to be performed for each incoming data unit. For the most frequent case of repeated data input, a number extraction, a total number comparison, an increment and a subtraction of a constant from the actual time are sufficient. Only two further subtractions need to be made before the storing.

The method is best suited for immediate repetition in that the first non-discriminated data unit after a gap is used for the renewed initialization. Only one other increment and one other subtraction are needed with each storage. This constant and gapless acquisition of the lower and the upper barrier of the response time as well as the number of discriminated data units makes it possible to directly evaluate the measured values statistically. If additional statistical measurements are made in the stream of data units, such as perhaps the average rate (data unit per time unit), time delay fluctuations etc., and are also used in the above mentioned evaluations, the expert in this field has the ability to make conclusive connections, for example through a time sequence analysis or the evaluation of histograms.

During initialization, the starting time is preferred as the difference between the actual time, at which the first non-discriminated data unit arrives, and its time stamp. The time stamp is an indication of the time, carried by the data unit, at which the data unit was treated in a certain way at the source—was transmitted for example. The time stamp in each data cell refers to the same processing point in time. The starting time corresponds approximately to the transmission delay of the data unit. The acquisition of this starting time can also be very conclusive for the statistical evaluation; although for measuring places far removed from the parameter monitor, for example on another continent, the starting time is very large, which could be detrimental. Therefore, a variation in the initialization provides for reducing the difference for determining the starting time by a constant amount, for example by the minimum value of the transmission delay. Such an adaptation of the starting time can also be directly considered in the time stamp.

BRIEF DESCRIPTION OF THE DRAWINGS

The invention will now be explained in greater detail with the example of an ATM arrangement and by means of three figures, where.

BEST MODE FOR CARRYING OUT THE INVENTION

An arrangement for testing an ATM switching unit is the basis of a concrete configuration example for the application of the method according to the invention. The transmitted data units are ATM cells and are called cells in the example as well. However, the invention is not limited to them in any way. It can be used for any desired data units, even those that have been defined for other layers of the OSI model.

Figure 1:
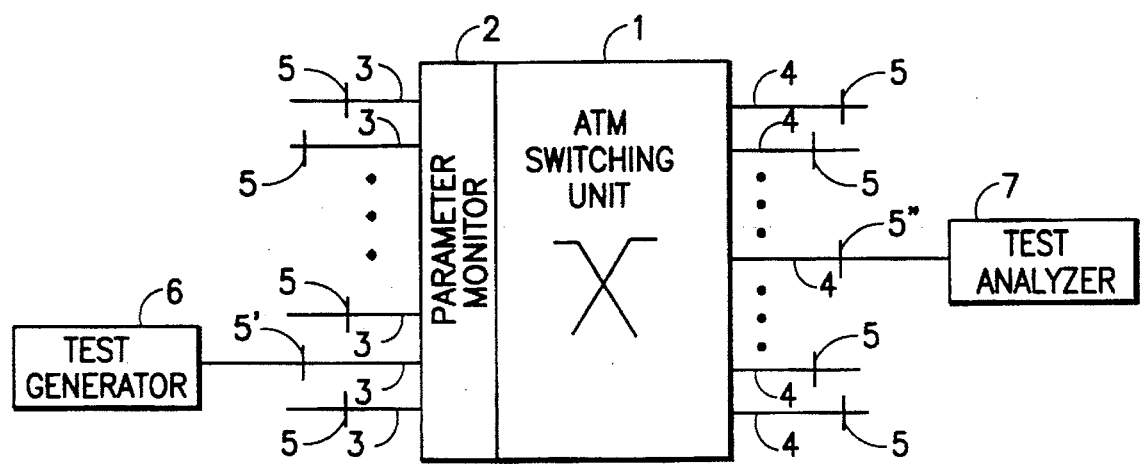
FIG. 1 is a measuring arrangement in principle.

FIG. 1 illustrates an ATM switching unit 1 with a number of inputs 3 and outputs 4. Each user or network access is connected through an interface 5. The inputs 3 are controlled by a parameter monitor 2. A test generator 6 is connected to one of the interfaces 5' at the input of the switching unit, and a test analyzer 7 to one of the interfaces 5" at the outlet. To test the parameter monitor 2, the test generator 6 emits test cells, whose header information makes sure they reach the test analyzer 7. The generator and analyzer may be located far from each other; in that case their time determinations are based on an absolute locally valid time indication. The emitted cells contain at least an identification number and a time stamp. The identification number contains a whole number, which is increased by one for each chronologically successive cell in a series of test cells. The test analyzer 7 is at least able to determine the arrival time of a cell and to extract the time stamp and the above named number. The time stamp contains an indication of the time at which the test generator 6 emitted the test cell.

The test generator 6 emits a stream of cells which is adapted to the agreement. The main characteristic quantity of the cell stream is its rate, namely the (infinitesimal) relationship of the countable events with respect to time. An agreement for the ATM cell streams comprises the peak cell rate or the peak emission interval T and the cell delay variation τ, in the future probably also the sustainable cell rate and the burst tolerance. According to presently applicable ATM specifications, a simple cell algorithm in the parameter monitor tests whether the next cell arrives before a theoretical arrival time determined by T and τ. If this is the case, the cell is marked or discarded. The test generator 6 emits cells in a way that causes the parameter monitor 2 to react intermittently. Now, it could happen that the switching unit itself is briefly overloaded, for example if too much traffic occurs simultaneously at the same output, thereby overflowing a buffer's capacity. However, this danger is imperceptibly small if the test is performed in an otherwise real operation. Thus, the gap-containing cell stream received by the test analyzer 7 provides a reliable picture of the cells discriminated as non-conforming by the parameter monitor 2. Differentiation of the various cell losses is made possible if the parameter monitor only marks the non-conforming cells, while the cells that were lost due to overload of the switching unit are missing, which can be determined by the test analyzer 7. However, the danger of overload increases of course if cells that do not comply with the agreement are switched.

Figure 2:
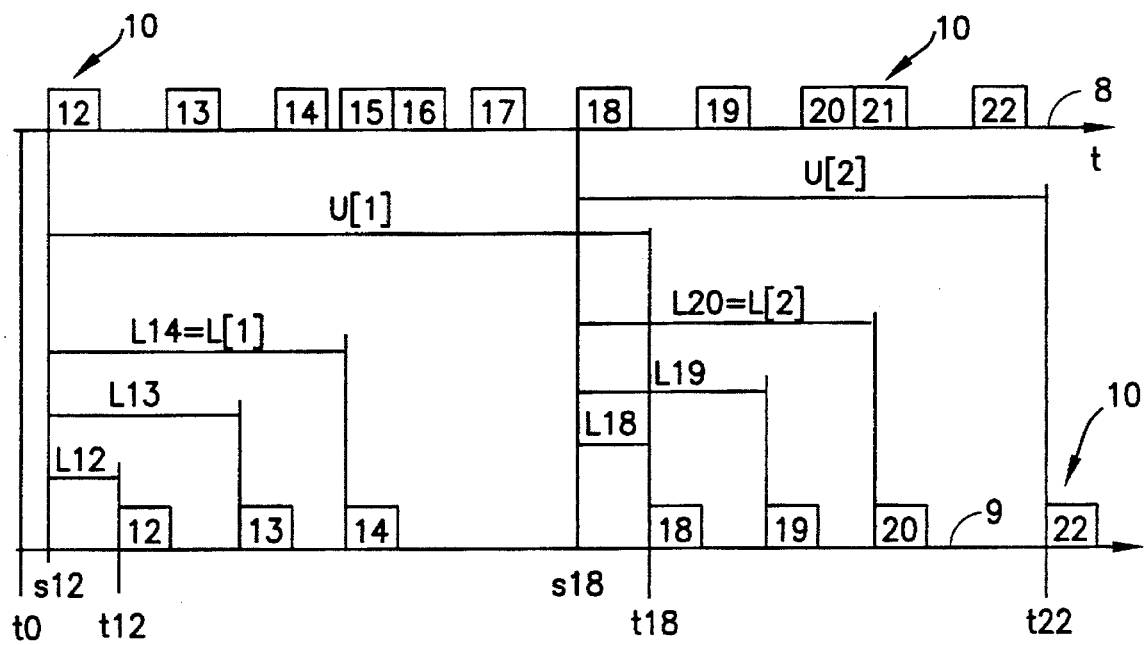
FIG. 2 is a schematic time sequence of the data units at the transmitting and the receiving place.

FIG. 2 schematically depicts the arrival in time of cells 10 to a predetermined place in the network, on a first time axis 8 at the test generator's place, and on a second time axis 9 at the test analyzer's place. Cells 10, which were recognized by the parameter monitor as non-conforming, have been discarded. Fewer cells 10 therefore arrive at the test analyzer's place than at the test generator's place. The eleven cells arbitrarily drawn as an example have been given identification numbers 12 to 22, which makes a timely assignment of the arrival events possible with respect to an absolute zero time t0. Each cell is individually marked with an identification number which it carries along; in addition, it carries a time stamp. The cell characterized by identification number 12—briefly called cell 12 here—contains the time stamp s12, an indication of the time when the test generator generated the cell 12, displaced by a constant value in each case. Since the emission time of a cell only deviates insignificantly and in a known manner from the time stamp, the two times in FIG. 2 and in the ensuing considerations are equal. Cell 12 is emitted by the generator at time s12. The analyzer measures the time t12 of the cell's arrival—potentially at a far removed place.

Cell 12 is the first cell arriving at the test analyzer after the start of the test. The time difference between t12 and s12 is recorded as starting time L12. Cells 13 and 14 arrive next. The sequence has no gaps until then. The time difference from the starting time is constantly updated, meaning that L13 and then L14 are recorded instead of L12. Cell 18 arrives at time t18. Obviously there is a gap in the sequence of cells, which indicates the loss of cells 15, 16 and 17; these cells followed each other too closely and were discarded by the parameter monitor. The last updated time difference L14 is now recorded as the lower barrier L[1] of the response time, the actual time difference t18—s12 is the upper barrier U[1]. These are exact measurements of barriers, which permit an estimate of the response time starting from the measuring place in the network.

With respect to further measurements, the cell 18 is once again the first non-discriminated cell. The difference in time between t18 and the time stamp s18 of cell 18 is recorded as a new starting time L18. The previously described process is repeated in an analogous manner. Time intervals L19 and L20 are updated. Cell 21 follows cell 20 too closely and is therefore discarded. The last recorded time interval L20 is stored as the lower barrier L[2], the other between t22 and s18 as the upper barrier U[2], plus the number of missing cells, one in this instance. To differentiate the stored values, they are given a sequential index, formalized by the square parentheses.

A continuation of this process allows a simultaneous or subsequent statistical evaluation. The expert is familiar with the methods in this regard. Such an evaluation permits conclusions with respect to the operating mode of the parameter monitoring. For example, a correlation between the number of discarded cells and the response time can be of interest. But a definition of the response time as a statistical magnitude is also made possible.

Figure 3:
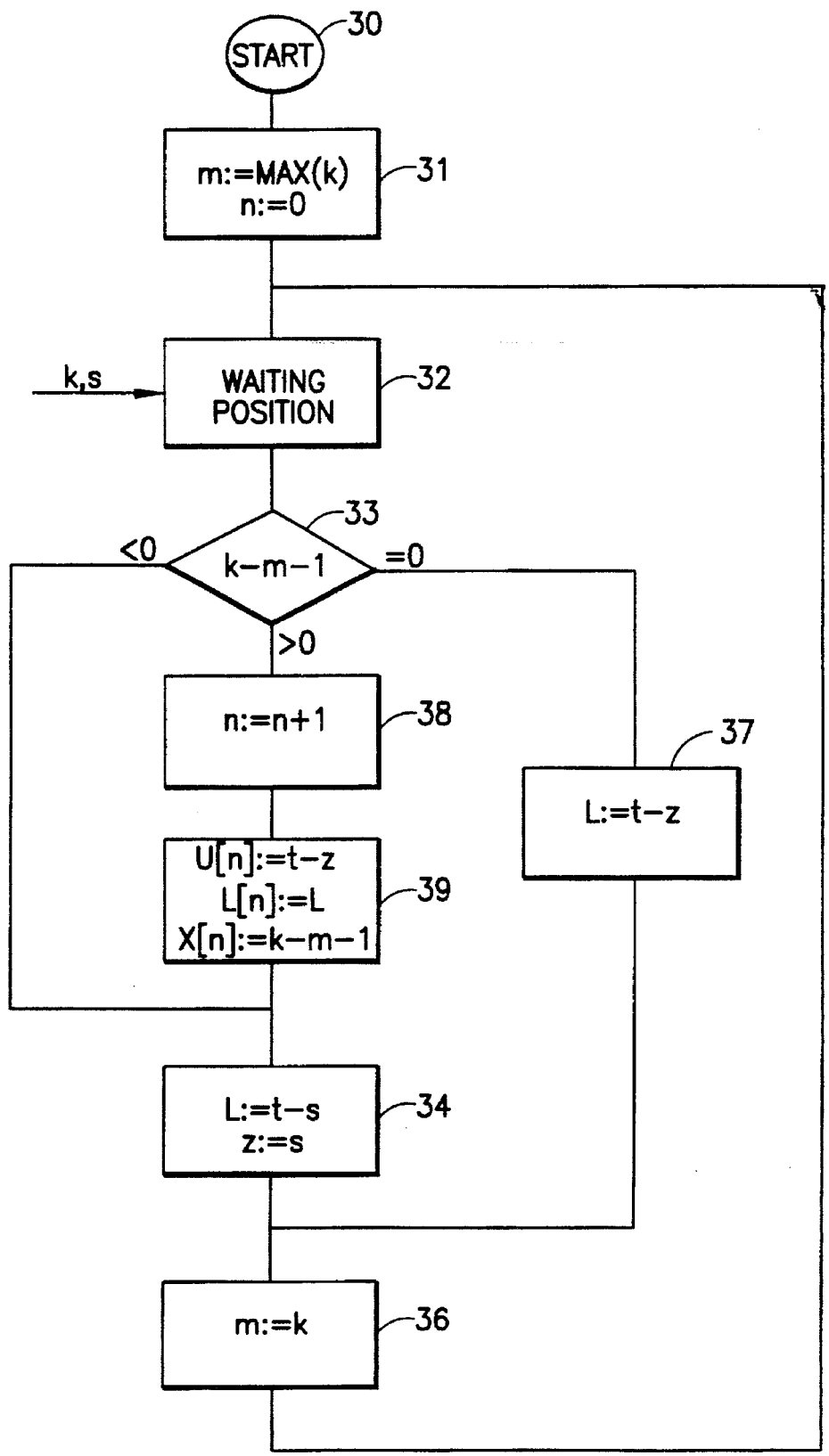
FIG. 3 is the flow diagram of the process steps.

The individual steps of the process are described in greater detail with the flow diagram of FIG. 3. At the start 30, in a first and one-time determination 31, the comparison number m for the identification numbers k of the cells are set to a starting value, which is at least as large as the highest identification number occurring in the arriving cells; in addition, index n for the storage of the measured values is set to 0. After that a waiting position 32 is adopted, until a cell which is equipped with an identification number k and a time stamp s arrives. The first run-through of a subsequent comparison 33 of k with m shows in that k is smaller than m+1, which leads to the initialization 34, in which the continuously updated time L is set to the value of the starting time as the difference between the actual time t and the time stamp s, and the used time stamp s is recorded as a transitional constant z. After that, the initialization with assignment 36 of identification number k as the comparison number m ends up in the cycle of the continuous monitoring and updating, in which a return to the waiting position 32 takes place. The mentioned cycle comprises the steps of waiting position 32, comparison 33, updating 37 of the time interval L, and assignment 36 of the comparison number m.

After the next arrival of a cell with a new identification number k and a new time stamp s, the ensuing comparison 33 never results in a value of k that is smaller than m+1. As long as the cell stream does not contain any gaps, thus the identification numbers k always increase by 1, the comparison 33 ends up in the continuous monitoring and updating cycle. The time interval L is then updated as the difference between the actual time and the significant time stamp, which was recorded as a transitional constant z during the initialization. After that, the comparison number m is set to equal the actual identification number, and the process returns to the waiting position 32.

It should be pointed out here that, although the process with the increase in the identification number k is preferred, it only represents one of many possibilities. It is only important that the sequence is known and provable. The assignment 36 and the comparison 33 must be adapted to the chosen possibility. The described process for starting and ending up in the cycle, as well as other details of the description, must be perceived as examples of this case, and not as a limitation of the possibilities, which the expert always knows how to utilize in this regard.

If a cell is lost, meaning if the comparison 33 produces a value of k that is larger than m+1, the process branches off to the storage step. First the storage index n is increased (increase 38). Then the three measured values of interest, the upper barrier U[n] of the response time, the lower barrier L[n] of the response time and the number of discarded cells X[n] is stored during a storage step 39. There the sought after number X[n] equals the difference between k and m+1, the lower barrier L[n] equals the last recorded time interval, and the upper barrier U[n] calculates to be equal to the respective time interval L.

The index n is only used when the values from more than one measurement must be registered in succession. FIG. 3 then also shows the immediate continuation of the process after the storage of the measured values, in that the next step is a new initialization 34. The expert can use whichever method he feels is suitable for discontinuing the measurement. For example, limitation through the index n can be imagined, limitation of the measuring time etc., or termination by simply switching off the test.

What is claimed is:

1. A method for evaluating the number (X{n}) of digital data units discriminated as a consequence of a parameter control (2) at an interface (5') of a digital network and for estimating a response time at a location of the evaluation (5") in the network, characterized by the following steps:

initiating a starting temporal distance (L12) upon the arrival of a first non-discriminated digital data unit (12), said temporal distance based upon the arrival time (t) of said first non-discriminated digital data unit (12) at the evaluation location (5") and a starting time (z);

permanently monitoring the completeness of the arriving non-discriminated data units by means of an identification number (k) carried by each data unit, and permanently updating the temporal distance between the arrival time (t) of each data unit and said starting time (z);

upon detecting an omission by the monitoring step, storing the last updated temporal distance (L14) as the lower bound (L{n}) of the response time, storing the temporal distance (L18) of the most recently received non-discriminated digital data unit (18) as an upper bound (U{n}) of the response time, determining the number of missing identification numbers, and storing the number of missing identification numbers as the number (X{n}) of discriminated digital data units.

2. A method according to claim 1, wherein each digital data unit includes a time stamp (s12), characterized in that the starting temporal distance (L12) is initiated as the difference between the actual arrival time (t12) of the first non-discriminated digital data unit (12) and the time stamp (s12) carried in the data unit.

3. A method according to claim 2, characterized in that the non-discriminated digital data unit (18) uncovering the omission serves as the first non-discriminated digital data unit of a new initiating step, such that the steps of the method are repeated, wherein an index counter (n) is running with and the three values (L{n}, U{n}, X{n}) are stored in an indexed manner.

4. A method according to claim 3, characterized in that the values stored in an indexed manner are statistically evaluated.

5. A method according to claim 4, characterized in that statistical data on the temporal and quantitative arrival of non-discriminated data units are investigated and considered in the statistical evaluation in separated steps of the method.

6. A method according to claim 1, characterized in that the non-discriminated digital data unit (18) uncovering the omission serves as the first non-discriminated digital data unit of a new initiating step, such that the steps of the method are repeated, wherein an index counter (n) is running with and the three values (L{n}, U{n}, X{n}) are stored in an indexed manner.

7. A method according to claim 6, characterized in that the values stored in an indexed manner are statistically evaluated.

8. A method according to claim 7, characterized in that statistical data on the temporal and quantitative arrival of non-discriminated data units are investigated and considered in the statistical evaluation in separated steps of the method.

* * * * *